INVENTOR.
JEAN MISSIOUX
BY
Woodhams, Blanchard & Flynn
ATTORNEYS

April 23, 1968  J. MISSIOUX  3,379,099
INSTALLATION FOR THE AUTOMATIC CONTROL OF
HYDRAULIC JACKS OR LIKE DEVICES
Filed Jan. 18, 1966  3 Sheets-Sheet 2

INVENTOR
JEAN MISSIOUX
BY
Williams, Blanchard & Flynn
ATTORNEYS

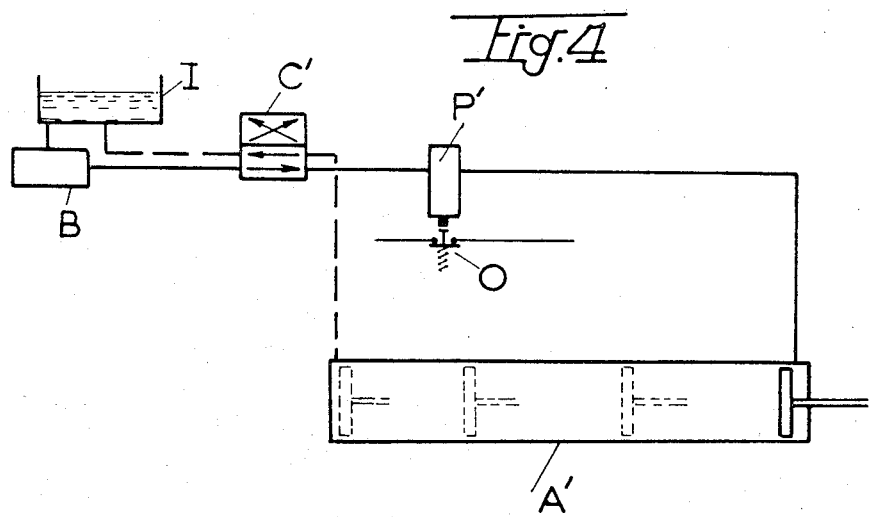
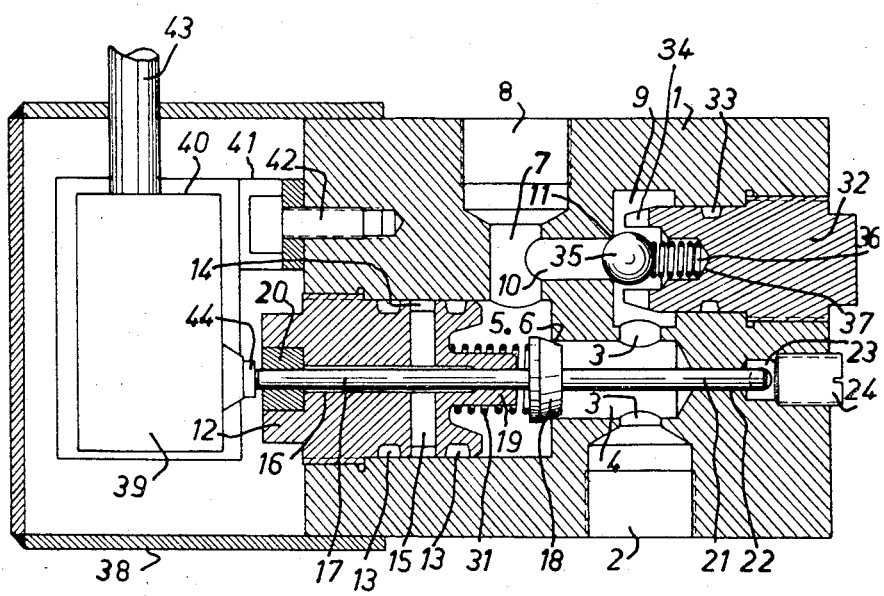

United States Patent Office 3,379,099
Patented Apr. 23, 1968

3,379,099
INSTALLATION FOR THE AUTOMATIC CONTROL OF HYDRAULIC JACKS OR LIKE DEVICES
Jean Missioux, Sannois, France, assignor to Botalam, Paris, France, a corporation of France
Filed Jan. 18, 1966, Ser. No. 521,335
Claims priority, application France, Oct. 22, 1965, 35,889
12 Claims. (Cl. 91—412)

ABSTRACT OF THE DISCLOSURE

A system for automatically controlling the flow of pressure fluid to one or a plurality of hydraulic jacks from a common source, wherein the pressure fluid can be selectively fed to the hydraulic jacks. A programmed selector device, which controls the distribution system, as in turn controlled by a flow detector which is positioned in the pipe conveying pressure fluid to the distribution system.

---

This invention has for its object an installation for the automatic control of hydraulic jacks or like devices.

When it is desired to actuate one or a number of hydraulic jacks having two or more stop positions in accordance with a predetermined cycle, it is found necessary to make provision for end-of-travel detectors corresponding in number to the total number of stop positions, thereby introducing a substantial complication in the installation and increasing the potential causes of failure.

One object of the invention is to provide a remedy for this disadvantage and to provide an installation for the automatic control of hydraulic jacks which is both considerably simplified and highly reliable in operation.

The installation in accordance with the invention for the automatic control of one or a number of hydraulic jacks which are supplied with a driving fluid from a same source of fluid under pressure comprises a distribution system for selectively feeding said hydraulic jacks, and a programmed selector system for producing action on said distribution system under the control of a flow detector which is placed in the pipe for conveying the driving fluid.

The flow detector can comprise a valve which is interposed in the driving fluid pipe and which normally closes off said pipe, said valve being connected outside said pipe to a device for controlling the programmed selector system.

As an advantageous feature, said valve is connected to the device for controlling the programmed selector system by means of a rod which traverses a leak-tight unit between two guides, a fluid-collecting chamber which is connected to the driving-fluid supply tank.

Figure 1:
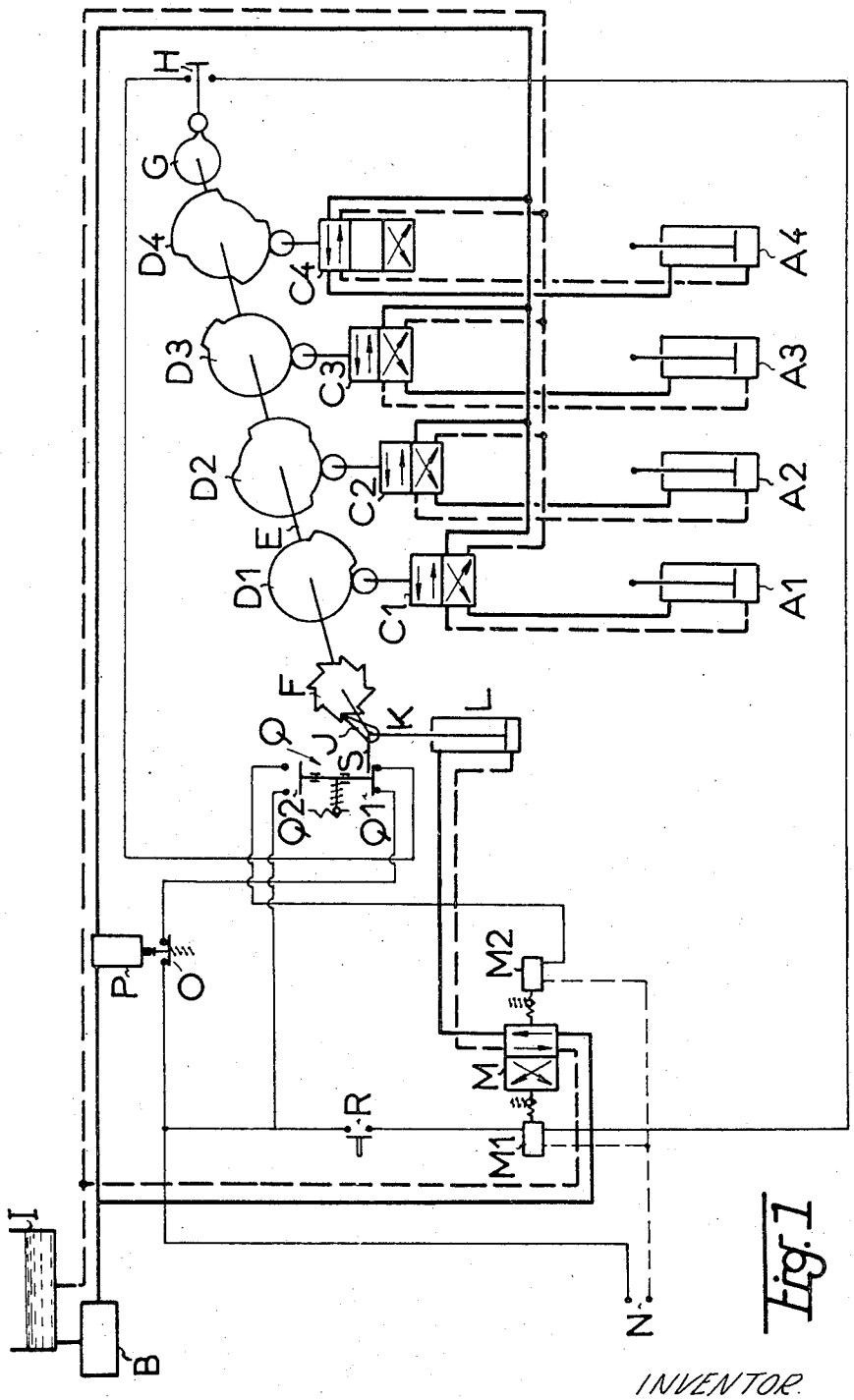
Figure 2:
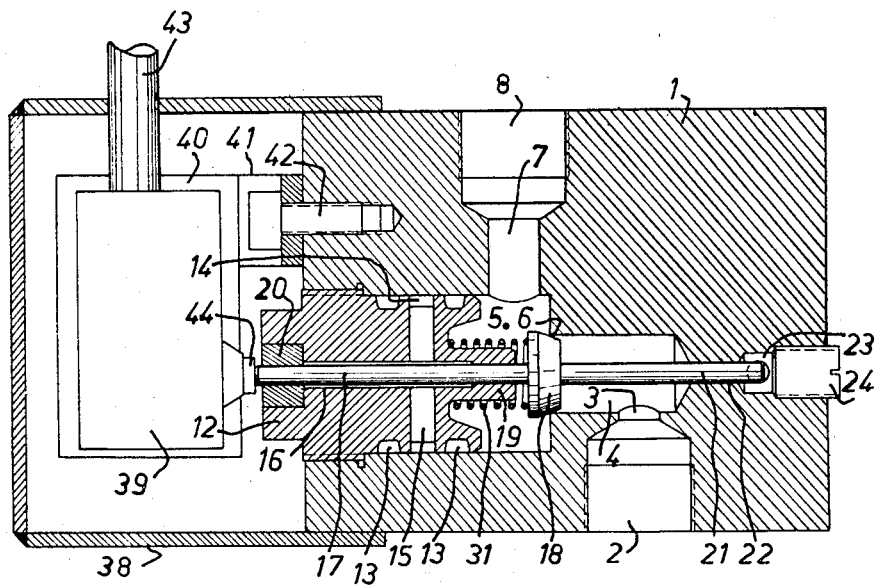
Figure 3:
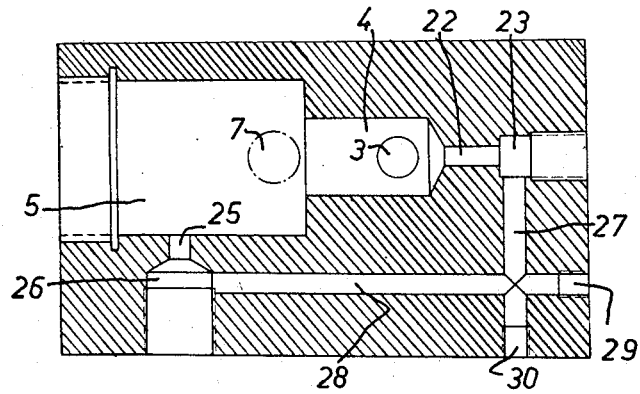

Further characteristics and advantages of the invention will become apparent from the following description of one form of embodiment of the invention and of one alternative form of embodiment which are given solely by way of example and which are shown in the accompanying drawings, in which:

FIG. 1 is a diagram of one form of embodiment;
FIG. 2 is a horizontal sectional view of the flow detector which is employed in this form of embodiment;
FIG. 3 is a vertical sectional view which is simplified by the omission of a certain number of parts;
FIG. 4 is a diagram of an alternative form of embodiment; and
FIG. 5 is a horizontal sectional view of the flow detector which is employed in said alternative form.

In the form of embodiment which is illustrated in the diagram of FIG. 1, the invention is applied to the automatic control of four jacks A1, A2, A3, A4 which are fed in parallel from a same source B of fluid under pressure via distributors C1, C2, C3, C4 respectively, each distributor being actuated by a cam D1, D2, D3, D4 respectively, said cams being carried by a same shaft E on which are additionally keyed on the one hand a driving ratchet-wheel F and, on the other hand, a cycle-limit cam G which produces action on a limit switch H.

In the diagram of FIG. 1, the pipes through which the fluid under pressure is circulated are shown in thick full lines and the pipes for returning the fluid to the tank I which feeds the source B are shown in thick broken lines.

The ratchet wheel F is actuated by a pawl J which is mounted at the end of the operating rod K of a double-acting driving jack L which is also supplied from the source B of fluid under pressure via a distributor M consisting of a four-way electrovalve with two indexed positions which is actuated in one direction by an electromagnet M1 and in the other direction by an electromagnet M2, these two electromagnets being energized by an electric current source N.

The circuit which energizes the electromagnet M1 comprises a switch O operable by a flow rate detector P which is placed in the pipe for conveying fluid under pressure to the jacks A1, A2, A3, A4, the terminals Q1 of a change-over switch Q which is actuated by the driving jack L as will be seen hereinafter, and the abovementioned limit switch H which is actuated by the cycle-limit cam G.

In addition, a manual starting contact R is connected in parallel with said circuit.

The circuit which serves to energize the electromagnet M2 comprises only the terminals Q2 of the change-over switch Q.

The lead-in conductors to the electromagnets M1 and M2 are shown in thin full lines and the lead-out conductors are shown in thin broken lines.

The change-over switch Q is provided with a moving contact system which is actuated successively by a lug S which is integral with the rod K of the driving jack L for the purpose of closing either the circuit which energizes the electromagnet M1 or the circuit which energizes the electromagnet M2.

The flow detector P is combined with the switch O in such a manner as to close this latter when the flow of fluid through the pipe is zero and to open said switch as soon as a flow is detected. Said flow detector will be described in greater detail hereinafter.

The operation of the installation will now be described.
In the stop position of the installation, the switch O is closed because the flow of fluid is zero and thus no fluid circulates in the detector P. The moving contact of the changeover switch Q is applied against the terminals Q1 and the limit switch H is held open by the cycle-limit cam G. The circuit which energizes the electromagnet M1 is therefore opened by the limit switch H and the circuit which energizes the electromagnet M2 is opened at the terminals Q2 of the change-over switch Q. Neither of said two electromagnets is energized and the distributor M is in a position caused by the pressurization of the upper chamber (as shown in the drawing) of the driving jack L, with the result that the lug S which is integral with the operating rod of the jack maintains the moving contact of the change-over switch Q applied against the terminals Q1.

In order to initiate the automatic cycle of operation of the installation, the manual contact R is depressed, the result thereby achieved being to energize the electromagnet M1 and to reverse the position of the distributor M. The pressure then builds up within the lower chamber of the driving jack L, the operating rod of said jack moves up and, by means of the pawl J, causes the ratchet wheel F and consequently the camshaft E to rotate, the first result thereby achieved being the closure of the cycle-limit contact H which is released by the cycle-limit cam G. The circuit which serves to energize the electromagnet M1 is accordingly closed by the switch O, the terminals Q1 of the change-over switch Q and the limit switch H, and the manual contact R can therefore be released.

However, as the camshaft E rotates, the distributor C1, for example, is accordingly actuated and initiates the operation of the jack A1. The flow detector P which detects a flow opens the switch O and the electromagnet M1 is de-energized whilst the distributor M nevertheless remains in the position in which it was set. At the end of travel, the lug S which is integral with the operating rod K of the driving jack L separates the moving contact of the change-over switch Q from the terminals Q1 and applies said moving contact against the terminals Q2. The electromagnet M2 is then energized in its turn and returns the distributor M to its initial position, thus again pressurizing the upper chamber of the driving jack L which consequently reverts immediately to its initial position and also restores the change-over switch Q to its initial position.

The opening of the contact O which is produced by the flow detector P therefore has the effect of producing a partial rotation of the camshaft E by means of a rapid back and fourth motion of the driving jack L.

As long as the flow detector P detects a flow, that is to say as long as the jack A1 is in motion, the complete assembly remains in the position in which it was set. As soon as the jack A1 stops the flow accordingly becomes zero, the contact O closes again and the electromagnet M1 is again energized. A new stage of the cycle then begins and will have the effect of actuating another jack, for example the jack A2 and so on in sequence. When the operating cycle which is programmed by the cams D1, D2, D3, D4 is finally completed, the camshaft will have completed one full revolution and the cycle-limit cam G will again open the limit switch H, thus stopping the installation which will thus have returned to the stop position initially described.

It will be observed that, by making use of the possible combinations of the distributors C1, C2, C3, C4 and cams D1, D2, D3, D4, each jack A1, A2, A3, A4 can be actuated once or a number of times in both directions during a same programmed cycle.

In the form of embodiment which is illustrated in FIGS. 2 and 3, the flow detector essentially consists of a block through which there has been bored a passageway for the circulation of fluid, said passageway being successively composed of a threaded inlet 2, a communicating duct 3, two chambers 4 and 5, the first chamber having a diameter which is smaller than that of the second so as to form a valve seating 6, a communicating duct 7 and a threaded connecting outlet 8.

The chamber 5, which has a threaded end is fitted with a plug 12 which is engaged therein by screwing and provided with two grooves 13 designed to accommodate sealing joints, a collecting passage 14 and communicating radial passage 15. The axial bore 16 of the plug is fitted with the rod 17 of the valve 18, said rod being guided within the head 19 of the plug by means of a narrowed portion of the axial passage 16 and at the outer end of the plug by means of a seal 20 which is forcibly fitted within a cavity of larger diameter or by means of a guide ring.

The rod 17 is provided beyond the valve with an extension 21 which is guided by a bore 22 drilled in the body of the apparatus and which thus passes into an outer cavity 23, said cavity being closed off by a plug 24.

As shown more clearly in FIG. 3, which is a vertical cross-section of the block 1, the collecting passage 14 communicates via a duct 25 with a chamber 26 which can be connected to the fluid supply tank.

The same applies to the chamber 23, by virtue of the ducts 27 and 28 which are sealed off at 29 and 30.

It will be noted that the valve 18 is in perfect pressure equilibrium inasmuch as one rod extremity 17 is exposed to atmospheric pressure by reason of the fact that it is located within the casing 38 and the other rod extremity 21 is exposed to atmospheric pressure by virtue of the ducts 27 and 28 and the chamber 26.

The assembly which has just been described is completed by a light spring 31 which is fitted around the head 19 and which applies the valve 18 against the seating 6.

Outside the body 1, a casing 38 contains a switch 39 carried by a small plate 40 which is supported by a bracket 41 and secured to the block 1 by screwing at 42.

There is shown at 43 the lead-out cable of the switch 38, the control push-button 44 of which is in contact with the rod 17.

It is apparent that the inlet 2 is connected to the source B of fluid under pressure which is shown in the diagram of FIG. 1, that the outlet 8 is connected to the jacks A1, A2, A3, A4, that the chambers 23 and 26 are connected to the fluid supply tank I and that the switch 39 corresponds to the switch O of said diagram.

When a jack A1, A2, A3 or A4 carries out a movement of displacement, the fluid circulates within the apparatus along the path 2, 3, 4, 5, 7, 8, the valve 18 being lifted from its seating in opposition to the action of the spring 31 so as to permit the flow of fluid.

The push-button 44 is therefore influenced by the rod 17 and the switch 39 opens for as long a period of time as the jack moves.

On the other hand, as soon as jack stops, there is no longer any circulation of fluid through the valve 18 which is once again applied against its seating 6 by the spring 31. The push-button 44 is thus immediately released and the switch is closed.

It is thus apparent that the installation is extremely simple inasmuch as only a single flow detector is necessary for the purpose of initiating one stage of the cycle as soon as the previous stage has been completed, and that any danger of failure is reduced to a minimum. Moreover, the initiation of a stage is not dependent on a predetermined position of the jack which is operated during the previous stage but only dependent on the stopping of said jack. Consequently, the invention is of particular interest in the automation of sequential control stages in which either one or a number of stages consist in producing any particular movement of a jack or like device.

In the alternative form which is illustrated in the diagram of FIG. 4, the invention is applied to the automatic control of a jack A' having a number of stop positions, whether variable or not, said jack being supplied from a source B of fluid under pressure by means of a distributor C', a flow detector P' being placed downstream of said distributor and designed to actuate a switch O so as to control a drive system with a view to initiating the programmed operation of said jack A'.

In this case also, a single flow detector is sufficient to initiate a stage of the cycle of operation of the jack A' as soon as the previous stage has been completed. However, since it must be possible for the fluid under pressure to flow through the detector P' indifferently either in one direction or in the other, it is necessary to ensure that said detector should be provided with a by-pass return valve, in addition to the valve 18 which has previously been described.

A flow detector as thus designed is illustrated in FIG. 5.

As appears from the figure, said flow detector comprises all the components of the flow detector which is illustrated in FIGS. 2 and 3 and is therefore of identical design but is provided in addition with a by-pass which consists of an extension of the communicating duct 3, a chamber 9 and an additional communicating duct 10 which connects said chamber 9 to the duct 7 and the opening of which in the chamber 9 forms the seating 11 of a valve 35. The chamber 9 is closed off by a threaded plug 32 provided with a sealing groove 33 and terminating in a cage 34 for accommodating the ball valve 35 which is held to its seating 11 by a light spring 36 placed within a recess 37 of the plug 32.

When the jack A′ moves in one direction, the fluid circulates within the detector as described earlier along the path 2, 3, 4, 5, 7, 8, the valve 18 being lifted from its seating. When the jack A′ moves in the opposite direction, the fluid circulates inside the detector along the path 8, 7, 10, 9, 3, 2, the valve 18 being accordingly applied against its seating whilst the valve 35 is lifted as a result of the pressure of the fluid.

The embodiments of the invention in which an exclusive property or privilege is claimed are defined as follows:

1. An installation for the automatic control of one or a number of hydraulic jacks or like devices having two or more stop positions and supplied through a pipe with driving fluid from a source of fluid under pressure, comprising a distribution system for selectively supplying said hydraulic jacks and a programmed selector system for controlling said distribution system under the control of a single flow detector which is placed in the pipe for conveying driving fluid, said selector system being actuated by a pulsed drive system and wherein said flow detector is designed to produce a drive pulse as soon as the flow which is detected within the driving fluid supply pipe becomes zero.

2. Installation as claimed in claim 1, wherein the pulsed drive system comprises electric control means and the flow detector is associated with a switch which closes the circuit of said electric control means as soon as the flow of driving fluid becomes zero.

3. Installation as claimed in claim 1, wherein the programmed selector system comprises a cam shaft wherein each cam acts on a distributor which supplies a jack, said cam shaft being driven in rotation by the pulsed drive system.

4. Installation for the automatic control of a plurality of hydraulic jacks or like devices which are supplied with driving fluid from a source of fluid under pressure, comprising a feed distributor for each jack, a programmed selector system comprising a cam shaft wherein each cam controls a distributor which feeds one jack, and a pulsed drive system comprising a double-acting jack which drives said cam shaft in rotation in one direction only by means of a unidirectional transmission system under the control of a single flow detector which is placed in the driving fluid supply pipe and which produces a drive pulse as soon as the flow which is detected in the driving fluid supply pipe becomes zero.

5. Installation as claimed in claim 4, wherein said double-acting jack is supplied with driving fluid successively in one direction then the other by means of a distributor of the electromagnetic control type, said jack being combined with a changeover switch for reversing said electromagnetic control at each end of travel thereof.

6. Installation for the automatic control of a plurality of hydraulic jacks or like devices which are supplied with driving fluid from a source of fluid under pressure, comprising a feed distributor for each jack, a programmed selector system comprising a cam shaft wherein each cam acts on a distributor which feeds one jack, an electrically operated pulsed drive system which drives said cam shaft in rotation under the control of a single flow detector which is placed in the driving fluid supply pipe and associated with a switch which closes the electric control circuit of the pulsed drive system so as to produce a drive pulse as soon as the flow which is detected in the driving fluid supply pipe becomes zero, said cam shaft being additionally provided with a cycle-limit cam which cooperates with a limit switch so as to open the electric control circuit of the pulsed drive system after the last jack selected in accordance with a predetermined program has been put into operation.

7. Installation as claimed in claim 6, wherein the electric control circuit of the pulsed drive system comprises a manual contact for initiating the cycle which is connected in parallel with the limit switch.

8. An installation for the automatic control of one or a number of hydraulic jacks or like devices having two or more stop positions and supplied through a pipe with driving fluid from a source of fluid under pressure, comprising a distribution system for selectively supplying said hydraulic jacks and a programmed selector system for controlling said distribution system under the control of a single flow detector which is placed in the pipe for conveying driving fluid, said flow detector comprising a valve which is inserted in the driving fluid supply pipe and normally closes off said pipe, said valve being connected outside of the pipe to a device for controlling the programmed selector system.

9. Installation as claimed in claim 8, wherein said valve is connected to said control device of the programmed selector system by means of a rod which traverses a leak-tight unit provided between two guide passages with a fluid-collecting chamber which is connected to the driving fluid feed tank.

10. An installation according to claim 8, wherein said valve is connected to said control device of the programmed selector system by means of its guide stem which traverses a leak-tight unit provided between two guide passages with a fluid-collecting chamber which is connected to the driving fluid feed tank.

11. Installation as claimed in claim 8, wherein said valve is connected to said control device of the programmed selector system by means of its guide stem which traverses a leak-tight unit provided between two guide passages with a fluid-collecting chamber which is connected to the driving fluid feed tank, and wherein a counter guide rod forms an extension of said guide stem beyond the valve and passes outside of the pipe into another fluid-collecting chamber which is connected to the driving fluid feed tank.

12. Installation as claimed in claim 8, wherein the flow detector comprises a bypass duct provided with a valve which permits the circulation of driving fluid indifferently in one direction or the other.

References Cited

UNITED STATES PATENTS

| | | | |
|---|---|---|---|
| 1,799,113 | 3/1931 | Miedbrodt | 91—36 X |
| 2,241,807 | 5/1941 | Cotner | 91—413 |
| 2,682,150 | 6/1954 | Ballinger | 60—97 |
| 3,228,300 | 1/1966 | Potts et al. | 91—1 |

EDGAR W. GEOGHEGAN, *Primary Examiner.*